United States Patent
Spaulding et al.

(10) Patent No.: US 6,638,075 B2
(45) Date of Patent: Oct. 28, 2003

(54) ELECTRICAL CONNECTION TO WINDSHIELD/BACKGLASS

(76) Inventors: James R. Spaulding, 46152 Apple La., Macomb, MI (US) 48044; Joseph Bosy, 11671 Shaffer, Davisburg, MI (US) 48350; Michael C. Heitmann, 53142 Oak Grove, Shelby Township, MI (US) 48315; James Arthur Cole, 36476 Haverhill, Sterling Heights, MI (US) 48312

( * ) Notice: Subject to any disclaimer, the term of this patent is extended or adjusted under 35 U.S.C. 154(b) by 0 days.

(21) Appl. No.: 10/083,805

(22) Filed: Feb. 27, 2002

(65) Prior Publication Data

US 2003/0162415 A1 Aug. 28, 2003

(51) Int. Cl.[7] .............................................. H01R 33/00
(52) U.S. Cl. ......................... 439/34; 439/917; 439/886
(58) Field of Search .......................... 439/34, 916, 917, 439/859, 886, 887, 935, 693, 936; 343/713, 711, 712; 219/203, 547

(56) References Cited

U.S. PATENT DOCUMENTS

| | | | | |
|---|---|---|---|---|
| 4,100,398 A | * | 7/1978 | Levin | 219/541 |
| 4,707,591 A | * | 11/1987 | Sprenger | 219/541 |
| 4,997,396 A | * | 3/1991 | Gold et al. | 439/801 |
| 5,208,444 A | * | 5/1993 | Winter et al. | 219/547 |
| 5,534,879 A | * | 7/1996 | Braun et al. | 343/713 |
| 5,760,744 A | * | 6/1998 | Sauer | 343/700 |
| 5,897,406 A | * | 4/1999 | Benes et al. | 439/859 |
| 5,938,957 A | * | 8/1999 | Tanahashi et al. | 219/219 |
| 6,025,806 A | * | 2/2000 | Deininger et al. | 343/713 |
| 6,103,998 A | * | 8/2000 | Kuno et al. | 219/203 |
| 6,164,984 A | * | 12/2000 | Schreiner | 439/86 |
| 6,445,350 B2 | * | 9/2002 | Takenobu | 343/713 |

* cited by examiner

*Primary Examiner*—Ross Gushi
(74) *Attorney, Agent, or Firm*—Christopher DeVries

(57) ABSTRACT

A window system for a vehicle including a glass assembly, an electrical device coupled to the glass assembly, a conducting post electrically coupled to the electrical device, sheet metal in the vehicle forming an aperture in the vehicle for accepting the glass assembly, a locating tab located on the border of the aperture, where the conducting post couples to the locating tab to position the glass assembly within the aperture to create an electrical connection to an electrical system in the vehicle.

11 Claims, 2 Drawing Sheets

ELECTRICAL CONNECTION TO WINDSHIELD/BACKGLASS

TECHNICAL FIELD

The present invention relates to the assembly of a windshield/backglass for a vehicle. More specifically, the present invention relates to a method and apparatus to make an electrical connection to an electrical device mounted to the windshield/backglass during the assembly of the windshield/backglass to a vehicle.

BACKGROUND OF THE INVENTION

In today's automotive assembly operations, AM radio, FM radio, cellular telephone antennas and heating grids may be incorporated into a piece of automotive glass such as a windshield/backglass or window glass assembly. The electrical connections between the antenna and/or heating grid to the electrical infrastructure of the vehicle are typically made with wiring harnesses through connectors that resemble "snaps" or "blade terminals ", as is known in the art. These snaps or blade terminals must be manually connected and may be difficult for an operator to reach and manipulate. The mating connectors for these electrical connectors are typically located at the header or upper portion of the window glass assembly near the roof panel inner or, in the case of the rear window, above and behind the rear seat, requiring a long and often awkward reach for an operator to make a proper connection. This manual connection of the antenna located on a window glass assembly is an awkward assembly step that may result in error.

Presently, a window glass assembly is installed in vehicles using plastic posts that serve as guides and aid in correctly locating the window glass assembly to the window opening. These posts are attached to the window glass assembly and are inserted into metal tabs or flanges at the roof corners of a vehicle. The window glass assembly is permanently bonded to the vehicle window aperture with an adhesive such as urethane located on the border of the window glass assembly. The manual electrical connection previously described cannot be made for a number of hours until the adhesive has cured to prevent dislodging the window glass assembly.

Accordingly, the manual electrical connection is a post-process that in certain cases must be done at a dealer. This may lead to quality issues and electrical problems in the vehicle.

SUMMARY OF THE INVENTION

The present invention is a method and apparatus for ensuring a proper connection between a vehicle electrical system and an electrical device located on or within the window glass assembly installed in the vehicle. The present invention utilizes the posts or guides on the window glass assembly and the metal locating tabs located on a vehicle to make an electrical connection for the electrical device located on the window glass assembly. The posts or guides are substantially similar to the plastic posts or guides of the prior art but are now made of a conductor such as aluminum. The posts or guides now double in purpose as positioners and terminals for the window glass assembly electrical component.

BRIEF DESCRIPTION F THE DRAWINGS

DESCRIPTION OF THE PREFERRED EMBODIMENT

Figure 1:
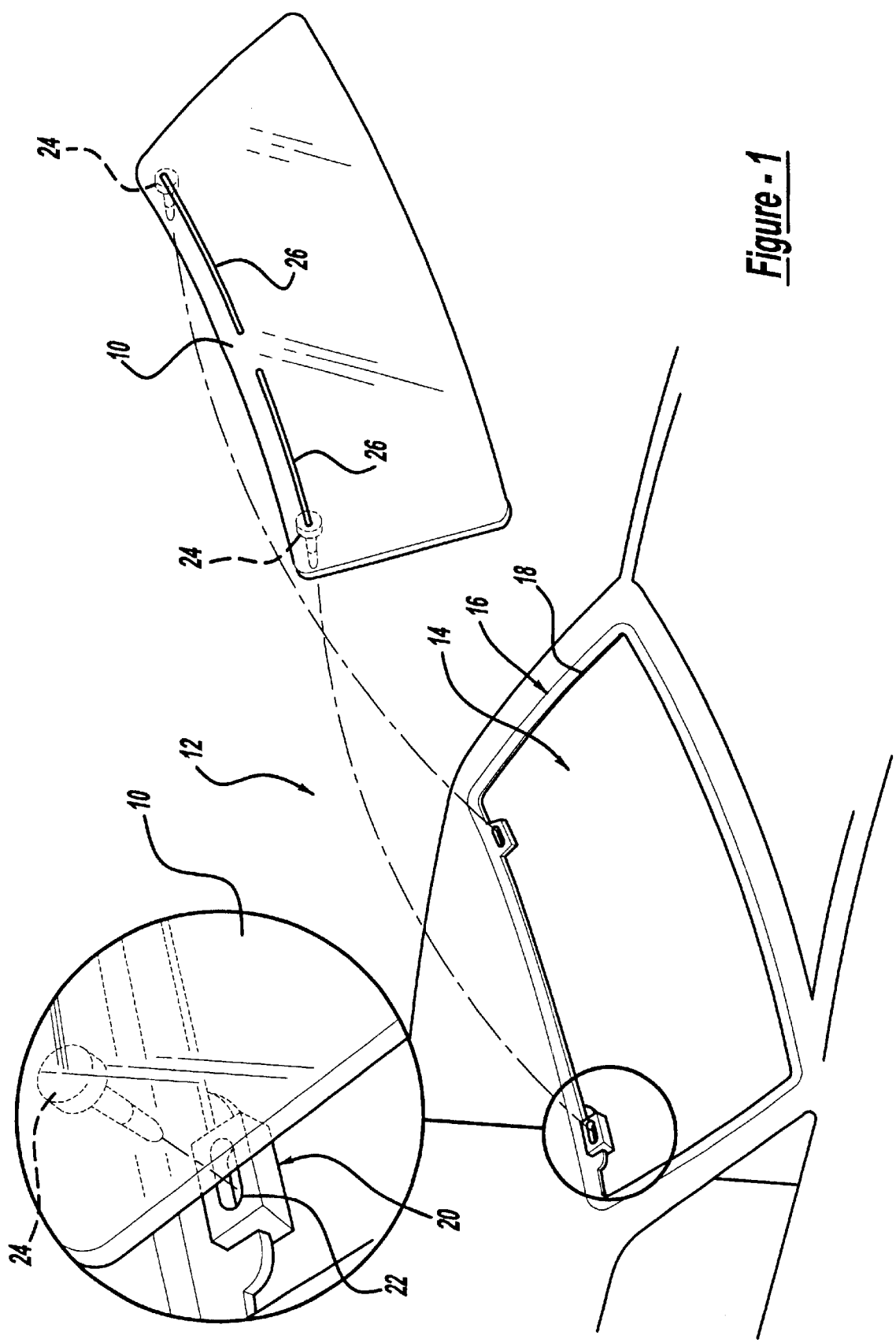
FIG. 1 is a diagrammatic drawing of a vehicle illustrating a backglass assembly installation in a vehicle.

FIG. 1 is a diagrammatic drawing illustrating the assembly of a piece of backglass 10 to a vehicle 12. The vehicle 12 includes an aperture 14 having a border 16. Locating tabs 20 have slots 22 that serve as a positioning device for the backglass 10. The backglass 10 includes posts 24 to position the backglass 10 in the aperture 14 and an adhesive 18 affixes the backglass 10 to the vehicle aperture 14. The posts 24 are electrically coupled to antenna 26 located on or within the backglass 10 or, in alternate embodiments, an electrical heater coupled to the backglass 10. The antenna 26 may be used for AM/FM radio, a GPS device, a cellular phone and similar electronic devices, but is not limited to such. The antenna 26 may comprise any antenna that is presently externally affixed to a glass assembly as well as those incorporated directly into the glass assembly. The antenna 26 may be optimized for a specific wave length or may be optimized for broad band operation. In the preferred embodiment of the present invention, the posts 24 are comprised of aluminum and coupled to the antenna 26 and backglass 10 using an electrically-conductive adhesive 11.

Figure 2:
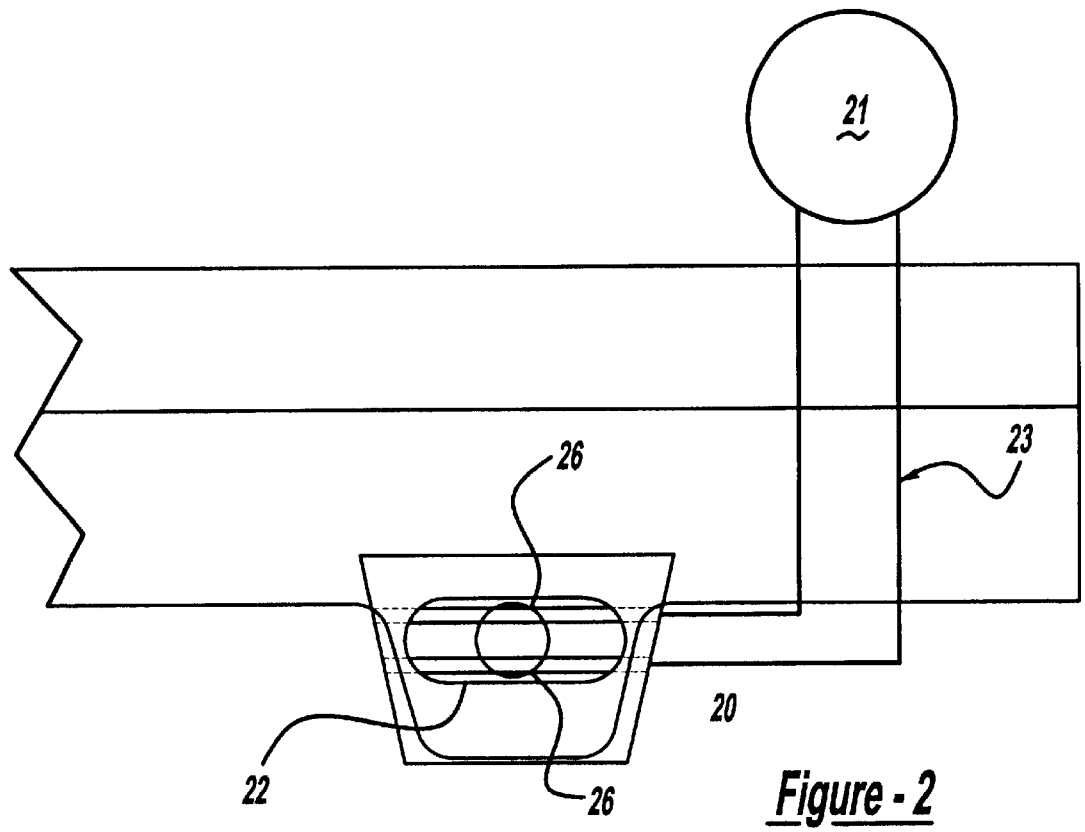
FIG. 2 is a diagrammatic drawing of a metal positioning tab of the present invention.

FIG. 2 is a diagrammatic drawing of the positioning tab 20 of the present invention. Within the aperture 22 are two spring steel wire rods 26 that act as a physical coupling mechanism to capture the posts 24 and an electrical conducting mechanism to connect the posts 24 to the electrical systems 21 of the vehicle 10. The posts 24 are connected to a wiring harness through said connector 23 that is further connected to electronic devices such as an AM/FM radio, a cellular phone and a GPS, but is not limited to such.

Figure 3:
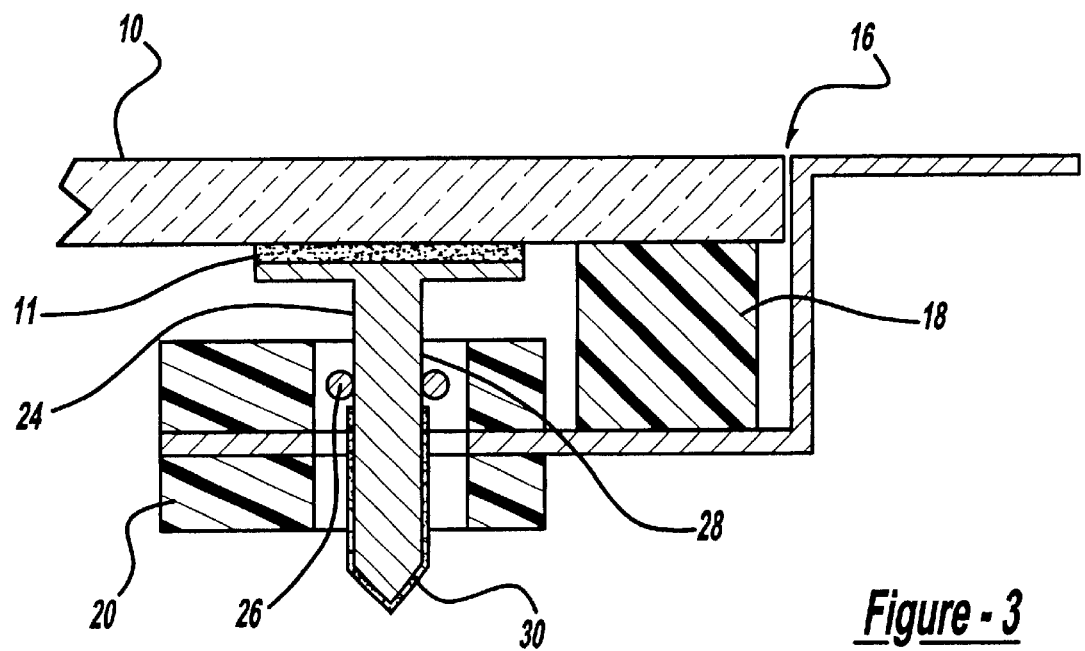
FIG. 3 is a cross-sectional drawing of a backglass piece and post assembly assembled to a window aperture.

FIG. 3 is a cross-sectional drawing of the backglass 10 and posts 24 assembled to the window aperture 14. The backglass 10 is coupled to the aperture by an adhesive 18 such as urethane. The posts 24 are coupled to the backglass 10 with an electrically-conducting adhesive 11 and are physically and electrically coupled to the spring steel rods 26 to fix the posts 24 in place. During the initial assembly of the backglass 10 to the vehicle 12, there is enough play for the posts 24 within the slots 22 to make fine adjustments to the position of the backglass 10 relative to the aperture 14.

In the preferred embodiment of the present invention, the posts 24 include an aluminum electrically-conductive section 28 coupled to the spring steel wire rods 26 and a coated nylon nonconducting section 30.

The present invention allows the positioning and mechanical coupling of a glass assembly to a vehicle while also providing an electrical coupling mechanism to an electrical device located on or within the glass assembly. The present invention eliminates the manual step of connecting wires to the glass assembly and improves the overall quality of the electrical connections made to the glass assembly.

While this invention has been described in terms of some specific embodiments, it will be appreciated that other forms can readily be adapted by one skilled in the art. Accordingly, the scope of this invention is to be considered limited only by the following claims.

What is claimed is:

1. A window system for a vehicle comprising:

a glass assembly;

an electrical device coupled to said glass assembly;

a conducting post electrically coupled to said electrical device;

sheet metal in the vehicle forming an aperture in the vehicle for accepting said glass assembly;

a locating tab located on the border of said aperture;

wherein said conducting post couples to said locating tab to position said glass assembly within said aperture to create an electrical connection to an electrical system in the vehicle.

2. The window system of claim 1 wherein said electrical device is an antenna.

3. The window system of claim 1 wherein said electrical device is a heater grid.

4. The window system of claim 1 wherein said conducting post is comprised of aluminum.

5. The window system of claim 1 wherein said conducting post includes a nylon-coated nonconducting section.

6. The window system of claim 1 wherein said conducting post is coupled to said glass assembly by an electrically-conducting adhesive.

7. The window system of claim 1 wherein said locating tab includes spring steel wire rods to physically and electrically couple said conducting post to the vehicle electrical system.

8. The window system of claim 1 wherein said glass assembly is bonded by a urethane adhesive coupled to said aperture.

9. The window system of claim 1 wherein said locating tab is comprised of an extension of steel.

10. A method of creating a physical and electrical connection for an electrical device coupled to a vehicle window to an electrical system in a vehicle comprising:

affixing conducting posts to the vehicle window, said vehicle posts electrically connected to the electrical device; and coupling said conducting posts physically and electrically to locating tabs coupled to a window aperture in a vehicle.

11. The method of claim 10 further comprising the step of bonding the vehicle window to the window aperture with an adhesive.

* * * * *